M. A. GOODSELL.
ATTACHMENT FOR FARM MACHINES.
APPLICATION FILED OCT. 10, 1917.

1,324,663.

Patented Dec. 9, 1919.
2 SHEETS—SHEET 1.

Witnesses:

Inventor
M. A. Goodsell,
By
Attorney

M. A. GOODSELL.
ATTACHMENT FOR FARM MACHINES.
APPLICATION FILED OCT. 10, 1917.
1,324,663.
Patented Dec. 9, 1919.
2 SHEETS—SHEET 2.
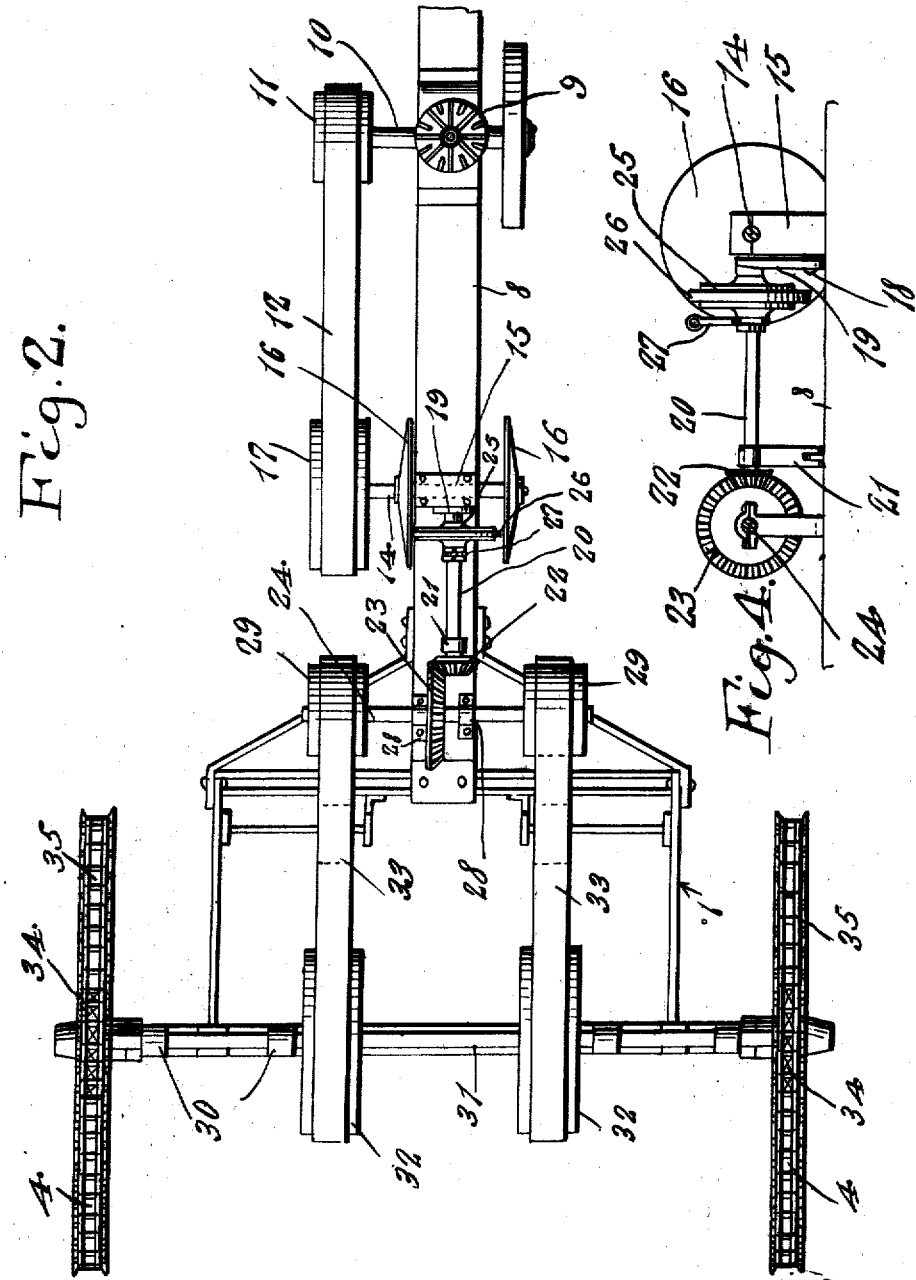

UNITED STATES PATENT OFFICE.

MELVIN A. GOODSELL, OF HOPKINSVILLE, KENTUCKY.

ATTACHMENT FOR FARM-MACHINES.

1,324,663.

Specification of Letters Patent.

Patented Dec. 9, 1919.

Application filed October 10, 1917. Serial No. 195,817.

*To all whom it may concern:*

Be it known that I, MELVIN A. GOODSELL, a citizen of the United States, residing at Hopkinsville, in the county of Christian and State of Kentucky, have invented certain new and useful Improvements in Attachments for Farm-Machines; and I do hereby declare the following to be a full, clear, and exact description of the invention, such as will enable others skilled in the art to which it appertains to make and use the same.

This invention relates to new and useful improvements in attachments for farm machines, and the principal object of the invention is to provide a device which is capable of being attached to cultivators, mowing machines and other implements used on and about a farm.

Another object of the invention is to provide a device which is capable of operation without the necessity of using horses or other draft animals.

A further object of the invention is to provide a device which may be readily mounted on the tongue of the machine, which tongue may be supported on casters or in any other suitable manner at its forward end.

A further object of the invention is to provide power transmitting means for farm machines wherein the sprocket wheels have their hubs disposed in the vertical plane of the traction wheels and connected to the same by sprocket chains which permit the traction wheels to yield to forward and rear thrusts due to inequalities of the ground.

With these and other objects in view, the invention consists in the novel combination and arrangement of parts which will be fully set forth in the following specification and accompanying drawings, in which:—

Fig. 2 is a top plan view of Fig. 1;

Fig. 4 is a longitudinal sectional view through the friction driving gear illustrating in detail the means for transmitting power to the driving wheels of the device.

Figure 3:
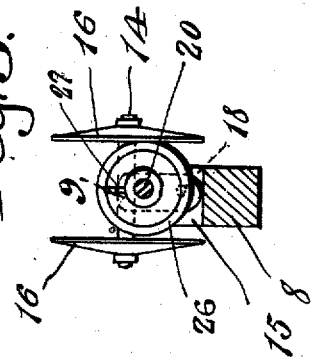
Fig. 3 is a transverse sectional view on line 3—3 of Fig. 1, illustrating in detail the friction driving gears.

Referring to the drawings, 1 designates as an entirety, a cultivator of the ordinary construction, comprising the usual frame 2, mounted on an arched axle 3, the ends of which are bent outwardly to provide spindles on which the wheels 4 are rotatably mounted. The power frame is designated by the numeral 5 and supports the usual cultivating plows 6 and this frame is adjustable by means of the usual lever and segment 7. Extending forwardly from the forward end of the frame 2, is the tongue 8 on which the attachment is mounted and to which the draft animals are usually hitched.

Mounted on the tongue intermediate its ends is a suitable driving motor 9 the drive shaft 10 of which is provided with a belt wheel or pulley 11 over which a driving belt 12 runs. Mounted on the tongue in the rear of the motor is a suitable bearing 15 supporting a transverse shaft 14 provided with friction disks 16. One end of the shaft projects beyond the bearings and has attached thereto a pulley 17 over which the belt 12 runs and it will thus be seen that when the motor 9 is set in operation, the pulley will drive the disks 16.

Pivotally connected as at 18, to the central pedestal 15 is a link 19, the upper end of which is formed with a bearing to receive the forward end of a movable shaft 20, the rear end of which is mounted in a suitable bearing 21 which is positioned so as to cause the pinions 22 to constantly engage a beveled gear 23 which is mounted on the intermediate shaft 24. The forward end of the shaft 20 has keyed thereto a friction wheel 25 which is provided with a friction face 26 formed of fiber, paper or the like, which friction is of less diameter than the distance between the friction disks 16 so that the same will only engage one of said disks at a time. A suitable shifting lever 27 is connected to the friction wheel 25 and provides a means by which the wheel may be shifted to engage either of the disks. The shaft 24 is journaled in suitable bearings 28 carried on the tongue and projects toward opposite sides of the farming implement on which the device is used, and this shaft has keyed or otherwise secured to opposite ends, pulleys 29 the use of which will appear as the description proceeds.

Mounted in suitable bearings 30 which are supported on the arched axle 3 is the main drive shaft 31 which has secured thereto intermediate its ends the spaced pulley wheels 32 which are connected to the pulleys 29 by belts 33. The shaft 31 extends beyond the ends of the bearings 30 and has attached to driving sprockets 34 over which the driving chains 35 pass. These driving chains pass around the wheels 4 as clearly shown in Fig. 1 and provide a means for propelling the implement over the ground which is being worked.

It will be apparent from the foregoing, that in use the motor 9 is set in operation thus driving the pulley 17 and the friction disks 16. Upon shifting the shaft 20 in one or the other direction it will be seen that the friction wheel 25 will engage one or the other of the friction disks thereby transmitting power through the pinion 22 and gear 23 to the shaft 24 which in turn drives the main drive shaft 31 by means of the belt 33 and thereby causes the sprockets 34 to revolve and rotate the wheels 4. It will be evident that the chain will when passing under the wheels 4 form a tread which will facilitate the driving of the device over the ground and it will be evident that the power of a driving mechanism constructed in accordance with this invention will be increased to the maximum.

Figure 1:
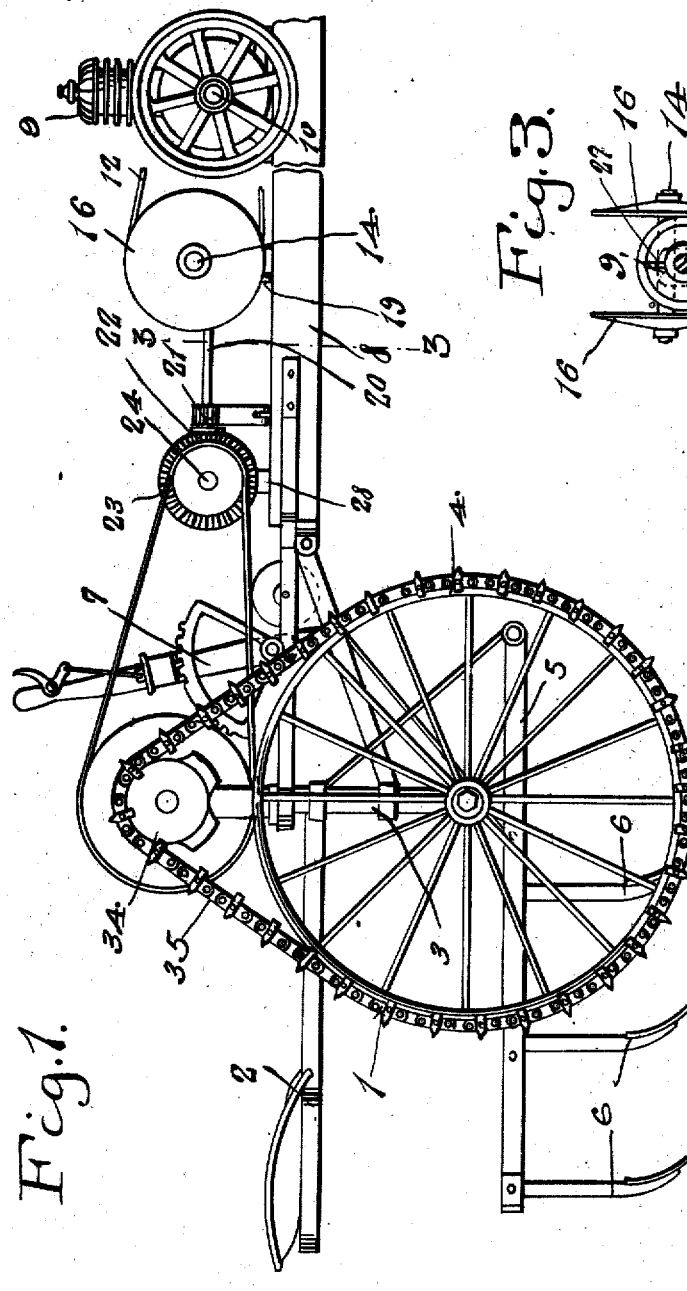
Figure 1 is a side view in elevation of a cultivator, having this attachment applied thereto.

As illustrated in Fig. 1 the wheels 4 have their hubs disposed in the vertical plane of the sprocket wheels 34 whereby the wheels are free to yield to forward and rear thrust during travel.

While in the foregoing there has been shown and described the preferred embodiment of this invention, it is to be understood that such changes may be made in the combination and arrangement of parts as will fall within the spirit and scope of the appended claims.

What is claimed is:—

1. A ground working apparatus including a tongue, a motor arranged on the tongue, a driven shaft connected with the shaft of the motor and extending parallel thereto, a pair of spaced friction disks mounted on said driven shaft, a friction wheel disposed between said disks, means to engage said friction wheel with either of said disks, a drive shaft connected with said friction wheel, sprockets on said drive shaft, and chains extending about said sprockets and the periphery of the wheel of the apparatus.

2. A ground working apparatus including a tongue, a motor arranged on the tongue, frictional gearing connected with the motor, a transverse drive shaft connected with said frictional gearing, sprockets for said drive shaft, wheels suspended below said drive shaft, and drive chains extending about said wheels and said sprockets, said wheels having their hubs disposed in the vertical plane of said sprockets whereby the wheels may yield to the forward and rear thrust during travel.

3. A ground working apparatus including a tongue, a motor arranged on the tongue, a transverse drive shaft connected with said motor, wheels suspended below said drive shaft, sprockets for said drive shaft, and drive chains extending about said wheels and said sprockets, said wheels having their hubs in the vertical plane of said sprockets whereby the wheels may yield to the forward and rear thrust during travel.

In testimony whereof I affix my signature in presence of two witnesses.

MELVIN A. GOODSELL.

Witnesses:
Oscar Goodwin,
A. K. Goodwin.